United States Patent [19]
Koczur et al.

[11] Patent Number: 5,518,613
[45] Date of Patent: May 21, 1996

[54] PORTABLE WATER PURIFYING AND DRINKING DEVICE

[75] Inventors: Paula M. Koczur, Topsfield, Mass.; Leonardo M. Garcia, Salem, N.H.

[73] Assignee: Harrison First International, Inc., Topsfield, Mass.

[21] Appl. No.: 356,080

[22] Filed: Dec. 14, 1994

[51] Int. Cl.$^6$ .................................................. B01D 24/08
[52] U.S. Cl. .......................... 210/266; 210/282; 210/284; 210/694; 210/753; 210/764
[58] Field of Search .................................... 210/266, 283, 210/284, 290, 694, 501, 502.1, 753, 764

[56] References Cited

U.S. PATENT DOCUMENTS

| | | | |
|---|---|---|---|
| 4,298,475 | 11/1981 | Gartner | 210/266 |
| 4,366,068 | 12/1982 | Ostreicher et al. | 210/767 |
| 4,769,143 | 9/1988 | Deutsch et al. | 210/266 |
| 4,859,340 | 8/1989 | Hou et al. | 210/502.1 |
| 4,894,154 | 1/1990 | Roz et al. | 210/266 |
| 4,995,976 | 2/1991 | Vermes et al. | 210/266 |
| 5,407,573 | 4/1995 | Hughes | 210/266 |

*Primary Examiner*—Neil McCarthy
*Attorney, Agent, or Firm*—Weingarten, Schurgin, Gagnebin & Hayes

[57] ABSTRACT

A personal portable water purifying and drinking device. The device includes a conduit having a chemical purification stage positioned at one end of the conduit, and a filtration stage positioned at the opposite end of the conduit. The chemical purification stage includes a chemical purifying agent and a residence chamber to neutralize bacteria and viruses. The filtration stage includes a filter and a cleaning medium, the filter having a diameter larger than the diameter of the conduit, and designed to remove exceedingly small microorganisms, such as potentially harmful parasites 1–2 μm in size, from the water to be filtered. A mouthpiece is mounted after the filtration stage of the conduit to draw fluid through the device and into the user's mouth.

18 Claims, 2 Drawing Sheets

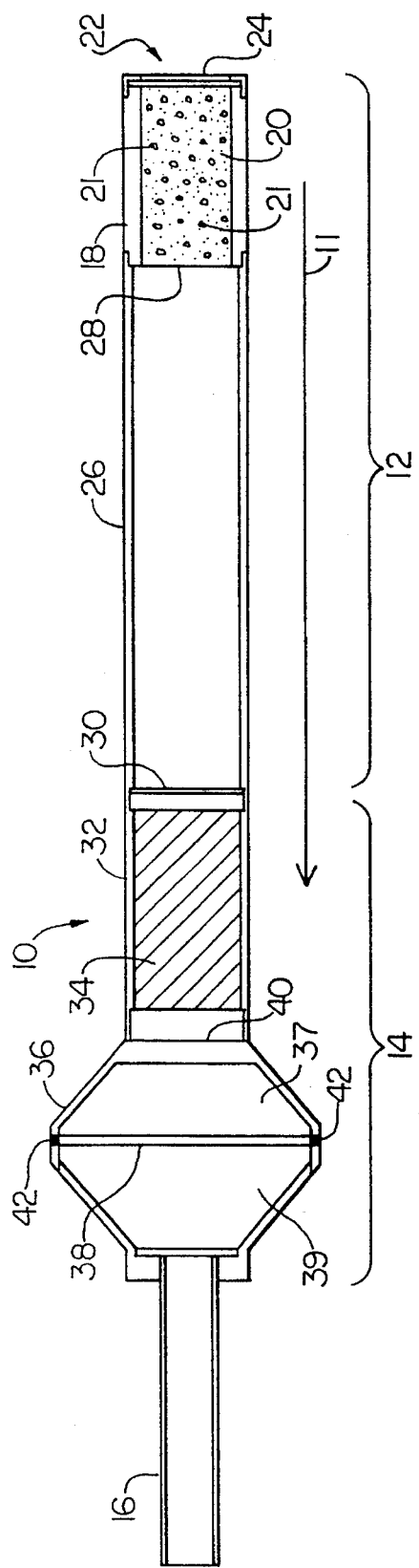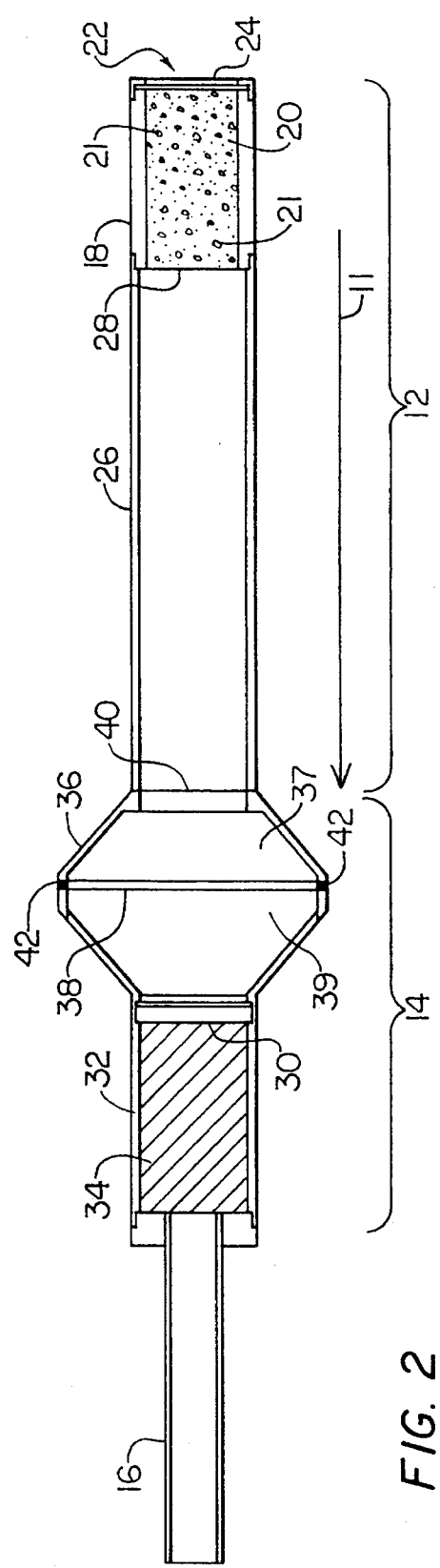
FIG. 1
FIG. 2

5,518,613

PORTABLE WATER PURIFYING AND DRINKING DEVICE

FIELD OF THE INVENTION

This invention relates to water purification devices, and more particularly to portable water purification devices.

BACKGROUND OF THE INVENTION

The importance of water purification is expanding as the condition of water supplies becomes increasingly polluted. Many bodies of water have become contaminated to a degree in which the water is not useable unless it is first purified to remove contaminants. The demand for purified water has also increased in recent years as consumers become more health-conscious. The quality of drinking water is coming under closer scrutiny, as evidenced by the popularity of brand-name bottled waters.

Portable, refillable water bottles have also become increasingly popular. These bottles are designed to contain a variety of fluids, from plain water to exotic sports drinks. These bottles typically include a resealable cap and a straw for transferring the liquid to the user's mouth. When the bottle is empty, the user frequently desires to refill it with purified water. However, a source of purified water is not always available, for example when the user is traveling, exercising, hiking, biking, or camping, or in emergency situations. Frequently, the water that is available is contaminated and must be purified before it can be consumed.

Several methods of purifying water are available. Purification tablets are inconvenient and give the water an undesirable flavor. Purification of water by boiling is time-consuming and a source of heat may not be available. Typical filtering devices that utilize pumps are bulky, heavy and not designed to be portable.

U.S. Pat. No. 4,995,976 to Vermes et al. discloses a portable water purification device in the form of a straw through which water can be drawn by a user. The interior of the tube is filled with filtering materials to remove contaminating substances, such as dirt, sediment, and bacteria.

U.S. Pat. No. 4,298,475 to Gartner discloses a tubular portable water purification system. The devices of Vermes et al. and Gartner are not capable of removing small parasites 1–2 μm in size.

It is an object of the invention to provide a portable water purification device that is designed to kill viruses and bacteria present in the water to be purified. Another object of the invention is to provide a portable water purification device that is designed to remove exceedingly small microorganisms, such as potentially harmful parasites 1–2 μm in size, from the water to be filtered. Yet another object of the invention is to remove Cryptosporidium from the water to be purified. Yet another object of the invention is to provide a device including a microfiltration membrane that excludes microorganisms as small as 1–2 μm in size without substantially restricting the flow rate of water through the device.

SUMMARY OF THE INVENTION

The invention is a personal portable water purifying and drinking device which is uniquely designed to remove exceedingly small organisms. The device includes a conduit comprising a chemical purification stage, a microfiltering stage, a chemical removal stage, and a mouthpiece for drawing water through the conduit by suction. The chemical purification stage includes a chemical purifying agent, and a residence chamber that allows an induction period for the chemical purifying agent to kill or inhibit the growth of bacteria and viruses. Water purified by the drinking device of the invention meets current U.S. Environmental Protection Agency (EPA) standards for microbiologically safe water.

The invention also includes a device in which a conduit including a chemical purification is stage positioned at a distal end of the conduit and includes a chemical purifying agent, a residence chamber, and a microfiltration membrane. The microfiltration membrane is mounted within the residence chamber, and the residence chamber is positioned proximate the chemical purifying agent. A chemical removal stage is positioned proximate to the chemical purification stage. The chemical removal stage includes a cleaning media to remove the chemical purifying agent. A mouthpiece is mounted at the proximate end of the conduit to draw water into the user's mouth by suction.

The invention also features a device including a conduit having proximate and distal ends and comprising physically separated stages. The stages include a first chamber positioned at an end of the conduit, the first chamber having a first end and a second end, a first screen being attached to the first end, a second screen being attached to the second end, the first chamber containing a fixed rate iodine release resin, the iodine of the resin capable of neutralizing biological contaminants consisting of bacteria and viruses. A second chamber is mounted on the second end of the first chamber. As fluid flows through the second chamber, the chemical purifying agent acts to kill bacteria and viruses in the fluid. A third chamber is mounted to the second end of the second chamber and contains activated charcoal capable of removing the iodine from the iodine exchange resin. A housing is mounted on the third chamber and includes a filter membrane to remove parasites smaller than approximately 5 μm. A mouthpiece is mounted on the housing to draw purified fluid into the user's mouth by suction.

The invention also encompasses methods of purifying drinking water using the above-described portable drinking water devices.

In preferred embodiments, the ratio of the time a fluid is in contact with the chemical purifying agent to the time the fluid flows through the residence chamber is no less than 1:5. Preferably, the chemical purifying agent includes a fixed rate iodine release resin, zinc, copper, or silver-impregnated activated carbon. The chamber containing the chemical purifying agent may include a plurality of apertures to allow the chemical purifying agent to come in contact with the fluid contained in the fluid resevoir. The microfiltering stage may include a microfiltration membrane encased in a housing and possessing a large surface area to remove parasites smaller than approximately 5 μm in size. The chemical removal stage may include a cleaning medium, such as activated charcoal, that adsorbs contaminants including residual purifying agent from the fluid. Preferably, the volume of the cleaning medium is at least twice the volume of the chemical purifying agent.

In other preferred embodiments, the device is designed so as to remove from the water to be purified microorganisms, such as potentially harmful parasites as small as 1–2 μm in size, for example, the parasite Cryptosporidium. Preferably, the microfiltration membrane may exclude microorganisms as small as 1–2 μm in size without substantially restricting the flow rate of water through the device. The restrictive nature of the microfiltration membrane with respect to water flow is overcome by a unique engineering design resulting in a larger surface area and increased flow rate permitting up to 200 cc/min of fluid to pass through the membrane. In one embodiment, the flow rate through the conduit is in the range of 50–200 cc/min, and the pressure drop required to move fluid through the conduit is in the range of 1–5 psi.

In preferred embodiments, screens are positioned in the conduit to contain the chemical purifying agent and the cleaning media; a series of screens may also separate the chemical purification stage, the residence chamber, the filtration stage, and the chemical removal stage.

As used herein, the term "chemical purification stage" is defined as a section of conduit including the chemical purifying agent and the residence chamber wherein the chemical purification step takes place. The term "chemical purifying agent" is defined to include substances that kill bacteria and viruses. The term "filtration stage" is defined as a section of conduit wherein harmful parasites are removed from the fluid. The "chemical removal stage" is defined as a section of conduit including the cleaning media wherein the fluid is cleaned of harmful chemicals. The term "residence chamber" is defined as a section of conduit wherein the fluid can react with the chemical purifying agent. The term "biological contaminants" is defined herein to include bacteria, viruses, or parasites. "Membrane" is defined to include any substance that permits the passage of certain small substances, but prevents the passage of large substances; the relative sizes being selected using membranes known in the art and having a selected exclusion size. "Microfiltration membrane" is defined to include any filter medium that prevents the passage of substances larger than about 5 µm, preferably larger than 1–2 µm. "Bactericidal agent" is defined as any substance that kills bacteria. "Bacteriostatic agent" is defined as any agent which inhibits the growth of bacteria. "Neutralize" is used herein to refer to biological contaminants that are killed or have been inhibited from growing.

DESCRIPTION OF THE DRAWINGS

The invention will be more fully understood from the following detailed description taken in conjunction with the accompanying drawings in which:

FIG. 1 is a schematic view of an embodiment of the invention;

FIG. 2 is a schematic view of an alternative embodiment of the invention; and

DETAILED DESCRIPTION OF THE INVENTION

Figure 3:
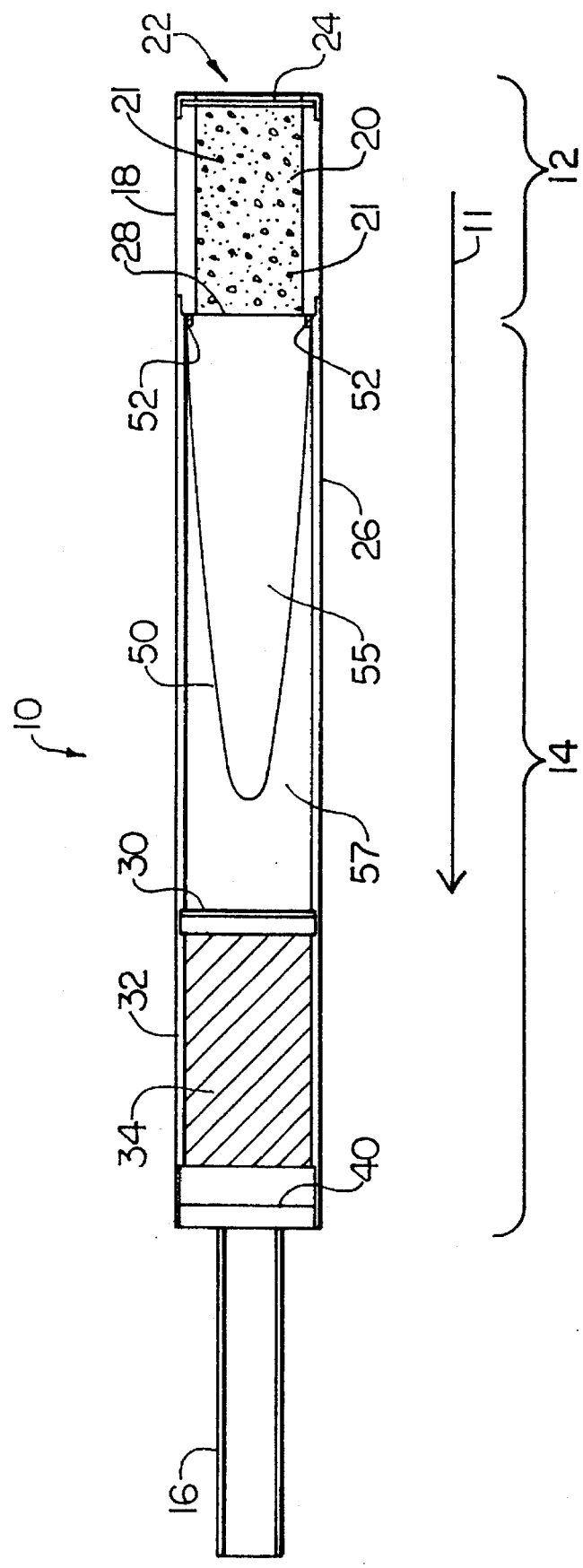
FIG. 3 is a schematic view of another alternative embodiment of the invention.

The portable water purifying and drinking device is shown generally in FIG. 1 at 10. The device includes a cylindrical conduit comprising a chemical stage 12, a filtering stage 14, and a mouthpiece 16. The flow of fluid is in the direction of the arrow 11. In operation, the user provides suction on the mouthpiece 16 to draw water to be purified through the inlet end 22, through the chemical stage 12 and filtering stage 14, and out the mouthpiece 16. The chemical stage 12, filtering stage 14, and mouthpiece 16 are made of any material approved by the Food and Drug Administration for use in containing liquids. Such materials include polypropylene, polystyrene and similar polymers. The device 10 is intended to be used in conjunction with a fluid resevoir, such as a sport bottle, can, or other fluid resevoir.

Considering the chemical stage 12 in more detail, the chemical stage 12 includes a resin chamber 18 containing a resin 20 positioned at the inlet end 22 of the device 10. The resin 20 is contained within the resin chamber 18 by screens 24 and 28. Screen 24 is bonded to the inlet end 22, and covers the inlet end 22 to filter sediment, and other large particles from the fluid. The screen 24 is preferably made from stainless steel to inhibit rusting, although it is possible to use other materials such as other FDA approved polymers. In one embodiment, the screen 24 has a mesh size equal to or less than 100 microns.

As illustrated in FIG. 1, the resin chamber 18 may include a plurality of apertures 21 to expose the fluid contained in the fluid resevoir to the chemical purifying agent prior to purification with the device 10. The unpurified fluid held in the resevoir flows through the apertures 21 and into the resin chamber 18 to irrigate the resin 20. A portion of the chemical purifying agent flows through the apertures 21 and into the fluid resevoir to neutralize a portion of the bacteria and viruses present in the fluid before it is passed through the device 10. Preferably, the apertures are sized so that the resin material 20 cannot flow out into the resevoir. In one embodiment, the apertures are approximately 100–200 µm in size. Alternatively, larger apertures may be used, however, a screen must be placed around the circumference of the resin chamber 18 so that the resin 20 cannot escape into the resevoir. For best bacterial and viral neutralization, it is preferred that the fluid held in the resevoir be exposed to the chemical purifying agent for at least 5 minutes in the case of a bacteriostatic agent, and at least 10 minutes when a bactericidal agent is employed.

The resin 20 may be any material that contains a chemical purifying agent capable of neutralizing bacterial and viral organisms. In a preferred embodiment, the resin is a biocidal continuous fixed-rate iodine release resin that releases a specified and consistent amount of iodine. The iodine acts as a bactericidal agent to kill bacteria from the fluid flow. In an alternative embodiment, a bacteriostatic agent, such as zinc, copper, or silver-impregnated activated carbon may be used to inhibit bacterial growth and to remove chlorine, iodine, and other contaminants from the water. An additional water-softening agent may also be included in the resin 20.

In use, it is preferred that the fluid to be purified come in contact with the resin for at least approximately 2 seconds in order for the iodine or other chemical purifying agent to work. In general, an intake rate of approximately 150 cc/min provides the fluid with the necessary exposure to the purifying agent.

In order to provide the purifying agent with adequate time to function, a residence chamber 26 is positioned after the resin chamber 18. The residence chamber 26 is generally an open section with screens 28 and 30 at each end, screens 28 and 30 preferably being 100 µm or less stainless steel or woven synthetic fabric screens. The residence chamber 26 contains the fluid treated with the chemical purifying agent found in the resin 20 as it flows through the apparatus 10 and permits the chemical purifying agent to chemically purify the fluid.

In general, the minimum ratio of the time the fluid is in contact with the resin 20 to the time the fluid flows through the residence chamber 26 is 1:5. It is therefore clear that as the flow rate of the fluid through the device decreases, the residence times in the resin chamber 18 and the residence chamber 26 increase proportionally. In one embodiment, using a fixed-rate iodine release, a flow rate of 150 cc/min combined with at least a 10 second residence time in the residence chamber 26 and a 2 second exposure to the resin 20 is sufficient to neutralize substantially all bacteria and virus in the fluid flow. In another embodiment with a flow rate of approximately 100 cc/min, the fluid is exposed to the resin 20 for a minimum of 3 seconds, and resides in the residence chamber for approximately 15 seconds.

The chemically purified fluid passes through screen 30 into the filtering stage 14 of the apparatus 10. The filtering stage 14 generally includes a cleaning chamber 32 containing a cleaning medium 34 such as activated charcoal or other cleaning medium. The cleaning chamber 32 is coupled to a housing 36 containing a microfiltration membrane 38. The cleaning medium 34 adsorbs the chemical purifying agent found in the resin 20 as well as other organic materials in the fluid flow, thus improving the taste and quality of the fluid. The cleaning medium 34 is preferably granular and of a mesh size that is small enough to provide a sufficient surface area to affect adsorption of the impurities, yet large enough to permit the fluid to flow through the cleaning chamber 32 substantially unrestricted. In order to remove substantially all of the chemical purifying agent, the volume of granular cleaning medium should be at least approximately twice the volume of the resin 20. In one embodiment, granulated activated charcoal is used, the granulated activated charcoal preferably having a mesh size range from 12×30, and more preferably 20×50. A preferred source of activated charcoal is coconut shell carbon or bituminous coal-based carbon. In an alternative embodiment, an activated carbon cartridge, such as a "ZETA PLUS" activated carbon filter (Cuno Process Filtration Products, Meriden Conn.) may be implemented.

The fluid next passes through a 20 μm screen 40 and into housing 36 which contains a microfiltration membrane 38. The microfiltration membrane 38 is held in place by a frame 42 and divides the housing into a prefiltration chamber 37 and a postfiltration chamber 39. Clean, chemically pure fluid from the cleaning medium flows through screen 40 and into the prefiltration chamber 37 where it comes into contact with the microfiltration membrane 38. Upon application of suction by the user from the mouthpiece 16, fluid flows from the prefiltration chamber 37 through the microfiltration membrane 38 and into the postfiltration chamber 39. As the fluid passes through the microfiltration membrane 38, parasites less than approximately 5 μm in size, and preferably no less than 1–2 μm in size, such as Cryptosporidium cysts, are removed from the fluid flow.

In one embodiment, the microfiltration membrane 38 is an absolute 1–2 μm membrane with an effective surface area of at least approximately 12 cm$^2$. The surface area of the microfiltration membrane 38 may be increased by pleating or layering to give a surface area of approximately 10-fold that of the diameter of the conduit. In one embodiment, the microfiltration membrane 38 possesses a surface area larger than the cross sectional areas of the housing 18, residence chamber 26, or cleaning housing 32. The microfiltration membrane is preferably made from cellulose, however other materials such as polyethersulfones, microporous fluoropolymers, polypropylene, acrylic copolymers on a nonwoven base, may also be implemented.

In an exemplary embodiment, a positively charged depth matrix membrane filter, such as S Series filter media (Cuno Process Filtration Products, Meriden Conn.) may be used. This type of filter possesses a very large surface area and can be up to 200 times the diameter of the positively charged matrix filter used. It will be apparent to those skilled in the art that other filters or combinations thereof with desired characteristics may also be implemented to achieve the desired purification results.

The large surface area of the microfiltration membrane 38 allows for increased flow efficiency for the invention. A microfiltration membrane with a large surface area permits fluid to flow from the prefiltration chamber 37 into the postfiltration chamber 39 in a substantially unrestricted manner when suction is applied from the mouthpiece 16. Quantitatively, a pressure drop of approximately 1–5 psi is required to move the fluid through the apparatus 10, and preferably a pressure drop of 3–4 psi is used. As a result, the invention allows the user to draw a reasonable intake of purified fluid. Although the chemical and filtering stages provide resistance to fluid flow, it is possible, using a microfiltration membrane with a large surface area in combination with a housing 36, to obtain flow rates from the mouthpiece of between 50–200 cc/min.

The dimensions of the chambers used in the invention are important in maintaining the effectiveness of the invention. In general, the residence chamber 26 must be of sufficient length and volume to allow the purifying agent to substantially kill all of the bacteria and viruses. In an exemplary embodiment, the residence chamber is approximately 3.8 inches long and has a diameter of approximately 0.75 inch. These dimensions provide the residence chamber 26 with a volume of approximately 28 cc.

The length and volume of the resin chamber is also important in providing the correct amount of chemical purifying agent. In an exemplary embodiment, the resin chamber 18 has a length of approximately 1.25 inch, and a diameter of approximately 0.6 inch. The cleaning chamber 32 has a length of approximately 1.75 inch and a diameter of approximately 0.75 inch. The housing 36 is shaped to hold the microfiltration membrane 38 with the appropriate surface area. In an exemplary embodiment, the housing 36 is conical, and has a maximum diameter of approximately 1.75 inch and a minimum diameter of approximately 0.75 inch, although other dimensions may be used. Water purified by the drinking device of the invention meets current U.S. Environmental Protection Agency (EPA) standards for microbiologically safe water.

Although the preferred embodiment illustrates the filtering stage 14 of the apparatus with the cleaning chamber 32 mounted ahead of the housing 36 with respect to fluid flow, such arrangement is not critical. In another embodiment, illustrated in FIG. 2, the housing 36 containing the microfiltration membrane 38 may be positioned ahead of the cleaning chamber 32. In this embodiment, the fluid flows through the chemical purification stage 12 and into the prefiltration chamber 37. The fluid, containing the chemical purifying agent, is filtered through microfiltration membrane 38 to remove parasites and harmful cysts as it flows into the postfiltration chamber 39. The chemical purifying agent and other organic materials are removed by the cleaning medium 34 before the fluid flows out the mouthpiece 16. Like the embodiment illustrated in FIG. 1, the resin chamber 18 may include a plurality of apertures 21 to allow the chemical purifying agent to come in contact with the fluid contained in the fluid resevoir.

This embodiment offers the advantage of a longer exposure time for the chemical purifying agent to function before it is removed by the cleaning media 34 than the residence chamber 26 of FIG. 1. As illustrated in FIG. 2, the fluid is exposed to the chemical purifying agent from the time it is exposed to the resin 20, through the residence chamber 26 and housing 36, until it comes in contact with the cleaning medium 34. This arrangement increases the exposure time to approximately 30 seconds, and is favored for fluids containing higher concentrations of bacteria and viruses, or when highly purified water is desired.

In an alternative embodiment, illustrated in FIG. 3, the housing 36 may be deleted and a microfiltration membrane 50 installed in the residence chamber 26. In this embodiment, the chemical stage 12 includes the resin 20 and resin chamber 18. The filtering stage 14 includes the cleaning chamber 32 filled with a cleaning medium 34, such as activated charcoal or other cleaning medium as indicated above. The filtering stage 14 also includes the residence chamber 26 that includes a microfiltration membrane 50 mounted at mounting points 52 to the walls of the residence chamber 26. The microfiltration membrane 50 divides the residence chamber 26 into a prefiltration chamber 55 and a postfiltration chamber 57. Filter screens 28 and 30 separate the residence chamber 26 from the resin chamber 18, and the cleaning chamber 32, respectively.

The alternative embodiment illustrated in FIG. 3 operates in a similar manner to the embodiments illustrated in FIGS. 1 and 2. Fluid to be purified is drawn into the inlet end 22 through screen 24. Resin 20, containing a chemical purifying agent, neutralizes bacterial and viral contaminants as the fluid flows through the apparatus 10. The resin chamber 18 may include a plurality of apertures 21 to allow the chemical purifying agent to come in contact with the fluid contained in the fluid resevoir. The fluid treated with the chemical purifying agent flows into the prefiltration chamber 55 of the residence chamber 26, and passes through the microfiltration membrane 50 into the postfiltration chamber 57. As the fluid flows through the microfiltration membrane 50, parasites less than approximately 5 μm in size, such as Cryptosporidium cysts, are removed. The filter membrane 50 is preferably made from a flexible material, such as cellulose, that is capable of accumulating materials larger than approximately 1–2 μm, however other materials, such as nylon, polyester, sintered ceramics, polyethersulfones, microporous fluoropolymers, polypropylene, acrylic copolymers on a nonwoven base, and the like, may also be used. In one embodiment, the microfiltration membrane 50 has a pore size of approximately 1–2 μm.

Like the above embodiments, microfiltration membrane 50 possesses a large surface area to remove parasites from the fluid flow. Preferably, the surface area of the microfiltration membrane 50 is 50–60 $cm^2$, and most preferably greater than approximately 12 $cm^2$. The filter membrane 50 may be pleated, layered, or fabricated into an elongated sack to achieve the desired surface area with a minimum amount of required space.

The filtered fluid passes through screen 30 and into the cleaning chamber 32. The cleaning medium 34 contained within the cleaning chamber 32 removes the chemical purifying agent used to destroy the bacterial and viral contaminants, as well as removing other organics present in the fluid. The purified fluid finally passes through a screen 40 and out the mouthpiece 16 into the users mouth. The large surface area of the microfiltration membrane 50 permits removal of parasites and harmful cysts to approximately 1–2 μm in size. At the same time, the prefiltration chamber 55 and the postfiltration chamber 57, in combination with the large surface area of the microfiltration membrane, permits the fluid to pass through the apparatus with reasonable suction by the user.

By implementing the microfiltration membrane 50 inside the residence chamber 26, this embodiment allows for the finest microfiltrate and largest surface area. Further, installing the microfiltration membrane 50 inside the residence chamber 26 alleviates the need for the bulky housing 36, thus making the apparatus more amenable to installation in a wider variety of fluid resevoirs, such as portable sport bottles, water bottles, and the like.

Although the screens used herein have been described as made from stainless steel, it is appreciated that the screens may be manufactured from other materials, such as sintered ceramics, sintered metals, porous plastics, and the like. The invention has been described with a conduit that is cylindrical, however other shapes, such as rectangular, square, or hexagonal, may also be implemented.

Although the invention has been shown and described with respect to an illustrative embodiment thereof, it should be appreciated that the foregoing and various other changes, omissions and additions in the form and detail thereof may be made without departing from the spirit and scope of the invention as delineated in the claims.

We claim:

1. A water purifying drinking device, comprising:
 a) a conduit having proximate and distal ends and comprising:
  a chemical purification stage positioned at said distal end of said conduit and having a diameter D, said chemical purification stage including a chemical purifying agent and a residence chamber, said chemical purifying agent positioned in said conduit at said distal end, said residence chamber positioned proximate said chemical purifying agent;
  a filtration stage positioned at said proximate end of said conduit, said filtration stage including a positively charged depth matrix filter membrane and a cleaning medium, said positively charged depth matrix filter membrane having a diameter greater than said diameter D of said conduit, said positively charged depth matrix filter membrane screening out particles 1–2 μm in size; and
 b) a mouthpiece mounted at said proximate end of said conduit.

2. The water purifying drinking device of claim 1, wherein the flow rate through said conduit is in the range of 50–200 cc/min, and the pressure drop required to move fluid through said conduit is in the range of 1–5 psi.

3. The water purifying drinking device of claim 1, wherein said chemical purification stage includes a chamber, said chamber containing said chemical purifying agent.

4. The water purifying drinking device of claim 3, wherein said chamber containing said chemical purifying agent includes a plurality of apertures.

5. The water purifying drinking device of claim 1, wherein said chemical purifying agent neutralizes a biological contaminant.

6. The water purifying drinking device of claim 1, wherein said chemical purifying agent includes a fixed rate iodine release resin.

7. The water purifying drinking device of claim 1, wherein said chemical purifying agent is selected from the group consisting of a bactericidal agent and a bacteriostatic agent.

8. The water purifying drinking device of claim 1, wherein said cleaning medium comprises activated charcoal.

9. A water purifying drinking device, comprising:
 a) a conduit having proximate and distal ends and having a diameter D, said conduit comprising:
  a chemical purification stage positioned at said distal end of said conduit, said chemical purification stage including a chemical purifying agent, a residence chamber, and a positively charged depth matrix filter membrane, said positively charged depth matrix filter membrane having a diameter greater than said diameter D of said conduit and mounted within said residence chamber, said positively charged depth matrix filter membrane screening out particles 1–2 µm in size, said residence chamber positioned proximate said chemical purifying agent; and a chemical removal stage positioned proximate to said chemical purification stage, said chemical removal stage including a cleaning media to remove said chemical purifying agent; and b) a mouthpiece mounted at said proximate end of said conduit.

10. The water purifying drinking device of claim 9, wherein the flow rate through said conduit is approximately 50–200 cc/min, and the pressure drop required to move fluid through said conduit is 1– 5 psi.

11. The water purifying drinking device of claim 9, wherein said chemical purifying agent is contained in a chamber within said chemical purification stage.

12. The water purifying drinking device of claim 11, wherein said chamber containing said chemical purifying agent includes a plurality of apertures.

13. The water purifying drinking device of claim 9, wherein said chemical purifying agent neutralizes biological contaminants.

14. The water purifying drinking device of claim 9, wherein said chemical purifying agent includes a fixed rate iodine release resin.

15. The water purifying drinking device of claim 9, wherein said chemical purifying agent is selected from the group consisting of a bactericidal agent and a bacteriostatic agent.

16. The water purifying and drinking device of claim 9, wherein said cleaning medium comprises activated charcoal.

17. A water purifying drinking device, comprising:

a) a conduit having proximate and distal ends and comprising physically separated stages, said conduit having a diameter D and comprising:

a first chamber positioned at an end of said conduit, said first chamber having a first end and a second end and having a, a first screen being attached to said first end, a second screen being attached to said second end, said first chamber having a plurality of apertures and containing a fixed rate iodine release resin, the iodine of said fixed rate iodine release resin capable of neutralizing biological contaminants selected from the group consisting of bacteria and viruses;

a second chamber having a first end and a second end, said first end of said second chamber mounted on said second end of said first chamber;

a third chamber having a first end and a second end, a third screen being attached to said first end of said third chamber, a fourth screen being attached to said second end of said third chamber, said first end of said third chamber mounted to said second end of said second chamber, said third chamber containing activated charcoal capable of removing said iodine from said iodine release resin;

a housing having a first end and a second end, said first end of said housing mounted on said second of said third chamber; and a positively charged depth matrix membrane filter having a diameter greater than said diameter D of said conduit, said positively charged depth matrix membrane filter mounted within said housing to remove parasites 1–2 µm in size; and b) a mouthpiece mounted on said second end of said housing.

18. A method of purifying drinking water comprising:

providing the water purifying drinking device of claim 1; and drinking from said device.

* * * * *